United States Patent [19]

Jensen

[11] Patent Number: 5,683,129
[45] Date of Patent: Nov. 4, 1997

[54] PET SANITATION DEVICE

[76] Inventor: Dick H. Jensen, 581 Kamoku St., suite 3602, Honolulu, Hi. 96826

[21] Appl. No.: 710,635

[22] Filed: Sep. 18, 1996

[51] Int. Cl.$^6$ .................................................. A01K 29/00
[52] U.S. Cl. .............................................................. 294/1.5
[58] Field of Search ....................... 294/1.3–1.5, 19.1, 294/55; 15/104.8, 257.1, 257.2, 257.4, 257.7; 119/161

[56] References Cited

U.S. PATENT DOCUMENTS

| | | | |
|---|---|---|---|
| 2,319,992 | 5/1943 | Hubbard | 294/19.1 |
| 3,474,833 | 10/1969 | Garrette et al. | 294/19.1 X |
| 3,786,780 | 1/1974 | Pezzino | 294/1.5 |
| 3,872,831 | 3/1975 | Cassidy | 294/1.5 |
| 4,012,067 | 3/1977 | Travis | 294/1.4 |
| 4,852,924 | 8/1989 | Ines | 294/1.5 |
| 4,958,871 | 9/1990 | Hemans | 294/1.4 |

FOREIGN PATENT DOCUMENTS

| | | | |
|---|---|---|---|
| 2804553 | 8/1979 | Germany | 294/1.5 |
| 7902410 | 9/1980 | Netherlands | 294/1.5 |

*Primary Examiner*—Johnny D. Cherry
*Attorney, Agent, or Firm*—Micahel I. Kroll

[57] ABSTRACT

A pooch potty (10) comprising an elongated handle (12) with a bag holder (14). A structure (16) is for attaching the bag holder (14) to a lower end of the elongated handle (12). A bag (18) is carried on the bag holder (14). A person (20) can grip an upper end of the elongated handle (12) and position the bag holder (14) with the bag (18) under a squatting dog (22), to allow fecal matter to drop into the bag (18) instead of falling onto the ground (24). The bag (18) can be removed from the bag holder (14) and be disposed of.

12 Claims, 4 Drawing Sheets

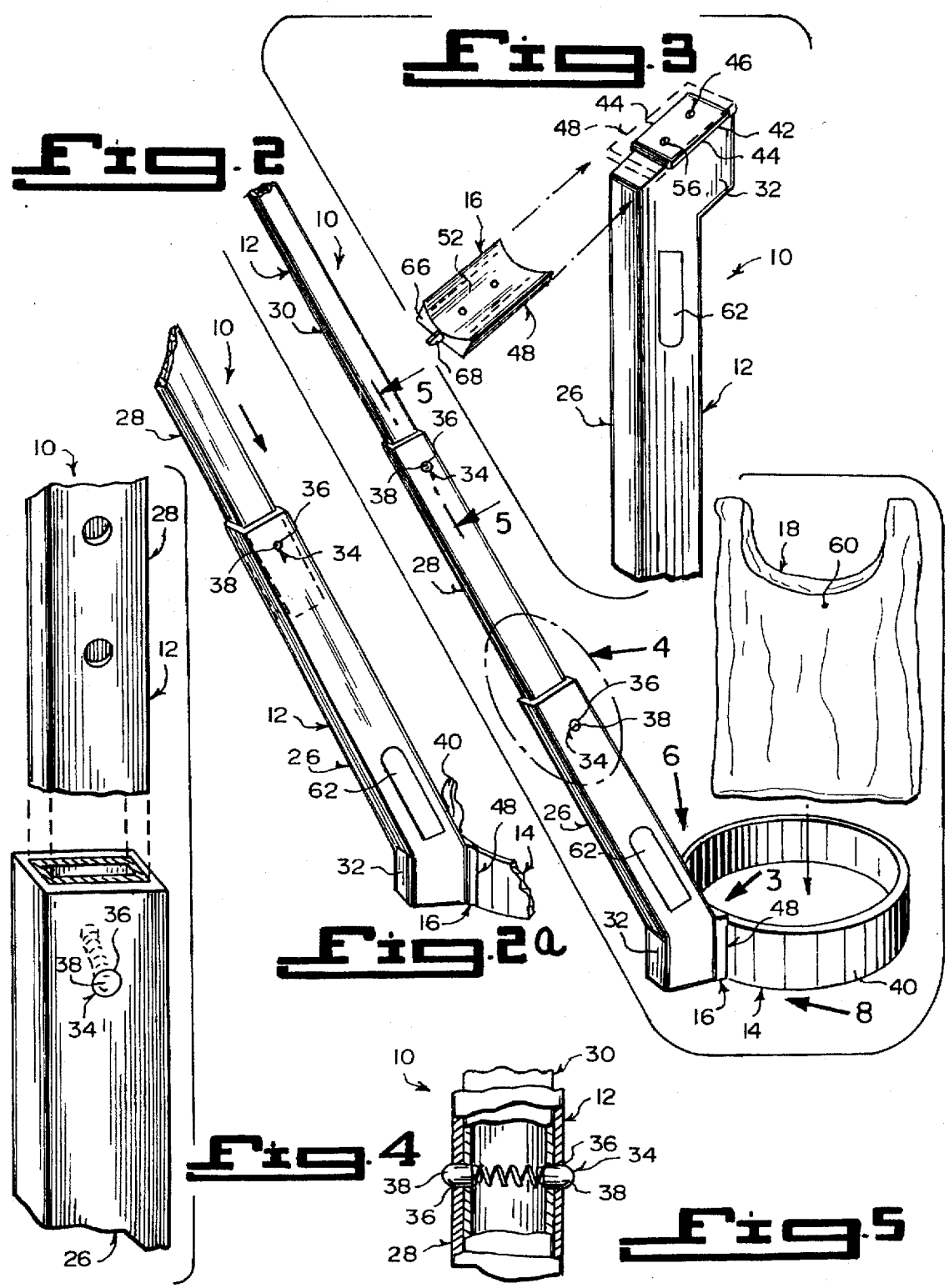

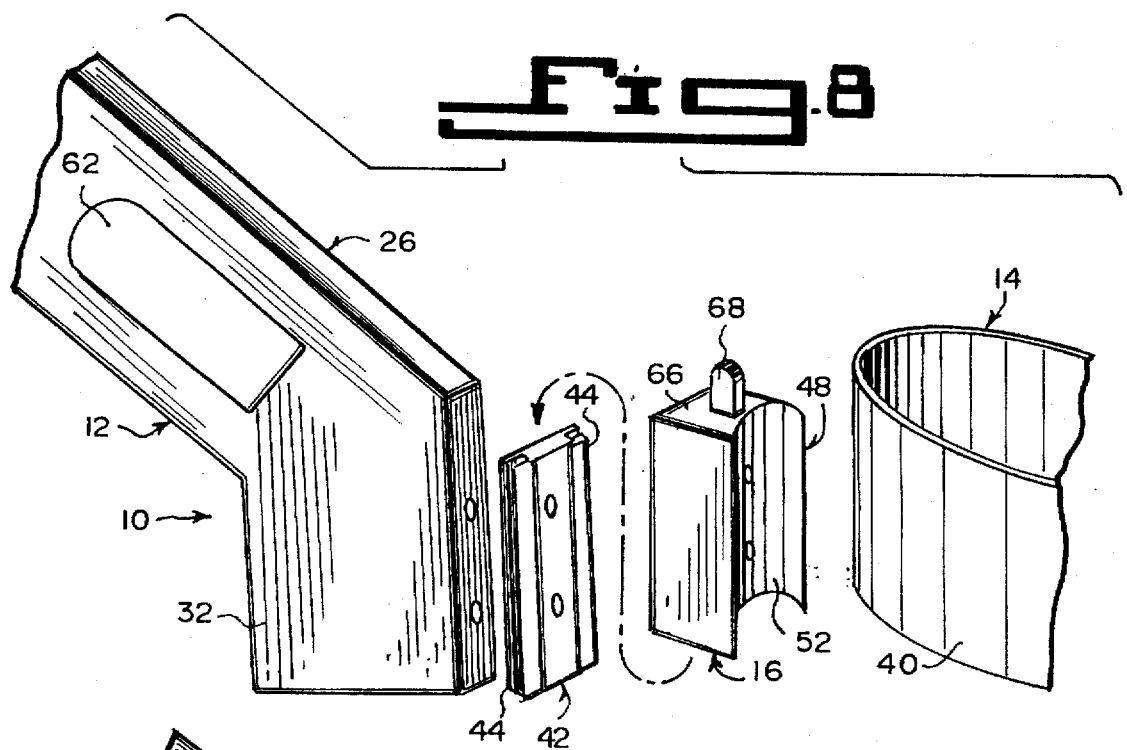
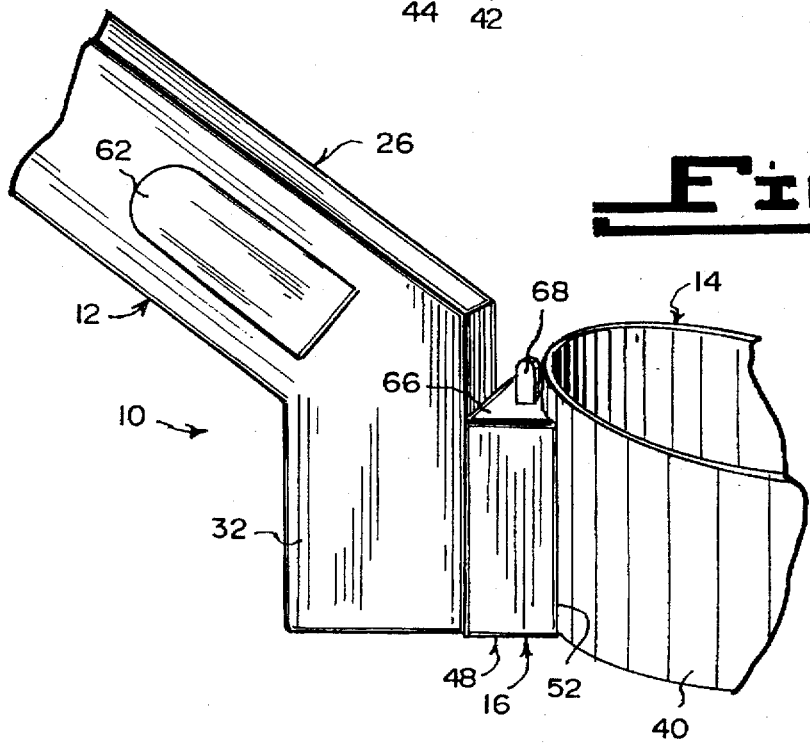

PET SANITATION DEVICE

BACKGROUND OF THE INVENTION

1. Field of the Invention

The instant invention relates generally to animal excrement collecting devices and more specifically it relates to a pooch potty.

2. Description of the Prior Art

Numerous animal excrement collecting devices have been provided in prior art, that will pick up animal droppings after the animals have deposited the droppings upon the ground. While these units may be suitable for the particular purpose to which they address, they would not be as suitable for the purposes of the present invention as heretofore described.

SUMMARY OF THE INVENTION

A primary object of the present invention is to provide a pooch potty that will overcome the shortcomings of the prior art devices.

Another object is to provide a pooch potty that is an elongated handle with a removable bag holder for supporting a disposable bag, which is positioned under a squatting dog, wherein fecal matter will drop into the disposable bag instead of falling onto the ground.

An additional object is to provide a pooch potty in which the elongated handle is adjustable in length to compensate for various sized people holding the elongated handle and for various sized dogs using the pooch potty.

A further object is to provide a pooch potty that is simple and easy to use.

A still further object is to provide a pooch potty that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 2 is an enlarged perspective view of the instant invention taken in the direction of arrow 2 in FIG. 1, showing the disposable bag being inserted into an annular bag holder and the top end of the handle broken away.

FIG. 2a is a perspective view similar to FIG. 2, with a middle segment of the handle and the annular bag holder broken away, showing the middle segment being retracted into the lower segment.

FIG. 3 is a perspective view taken in the direction of arrow 3 in FIG. 2, with the lower segment of the handle broken away and inverted, showing the spring release member separated from the annular bag holder ready to be installed onto the handle lock.

FIG. 4 is a further enlarged perspective view of the area in FIG. 2 indicated by arrow 4, with the middle segment of the handle broken away.

FIG. 5 is a cross sectional view taken along line 5—5 in FIG. 2, showing the spring loaded lock pins in greater detail.

FIG. 8 is an exploded perspective view taken in the direction of arrow 8 in FIG. 2, with the handle and annular bag holder broken away.

FIG. 9 is an assembled perspective view of the area in FIG. 1 indicated by arrow 9.

Similar reference characters denote corresponding features consistently throughout the attached drawings.

DETAILED DESCRIPTION OF THE PREFERRED EMBODIMENTS

Figure 1:
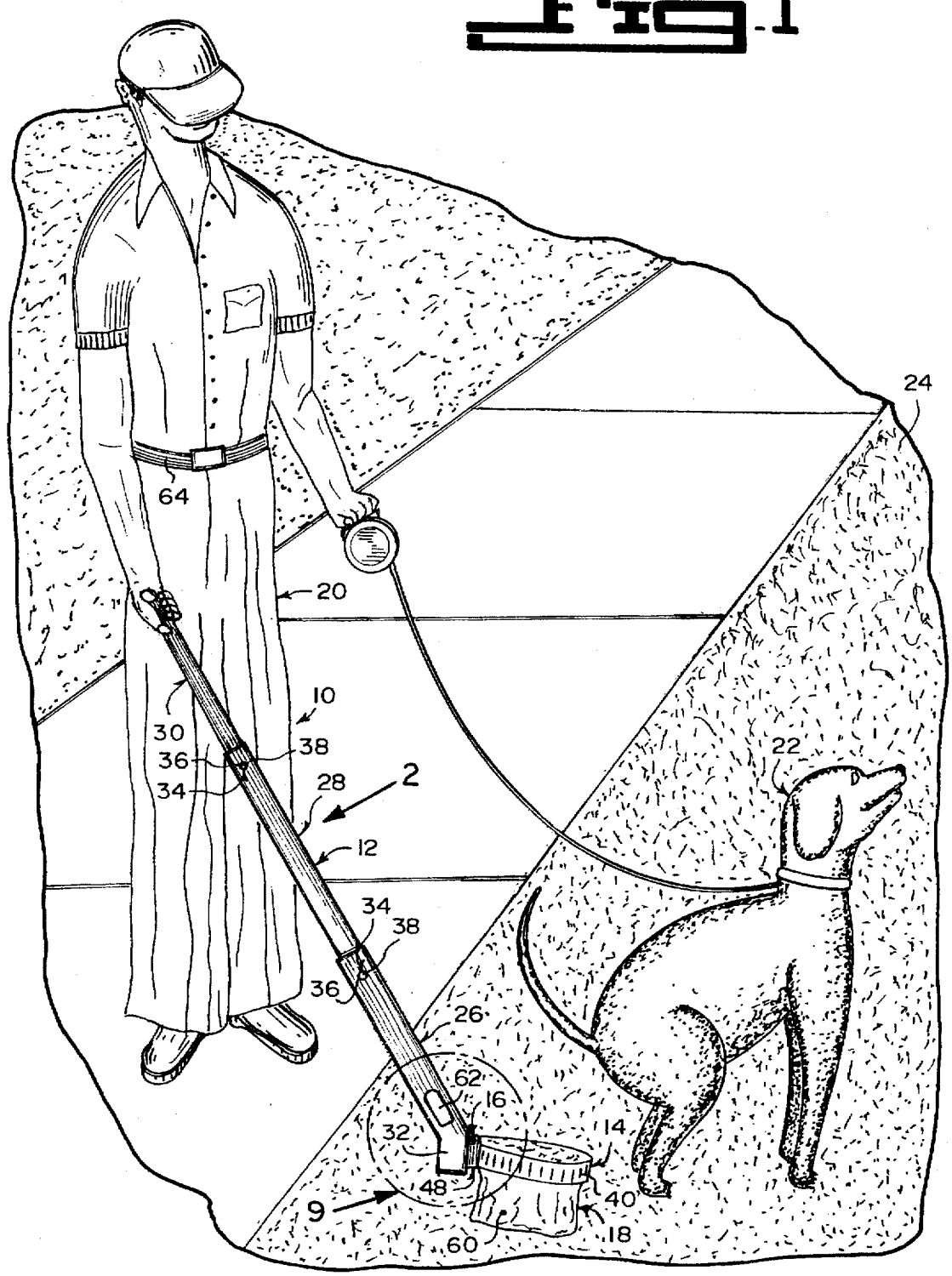
FIG. 1 is a perspective view of the instant invention, in which an elongated handle is held by a person and a disposable bag is being positioned under a squatting dog.
Figure 6:
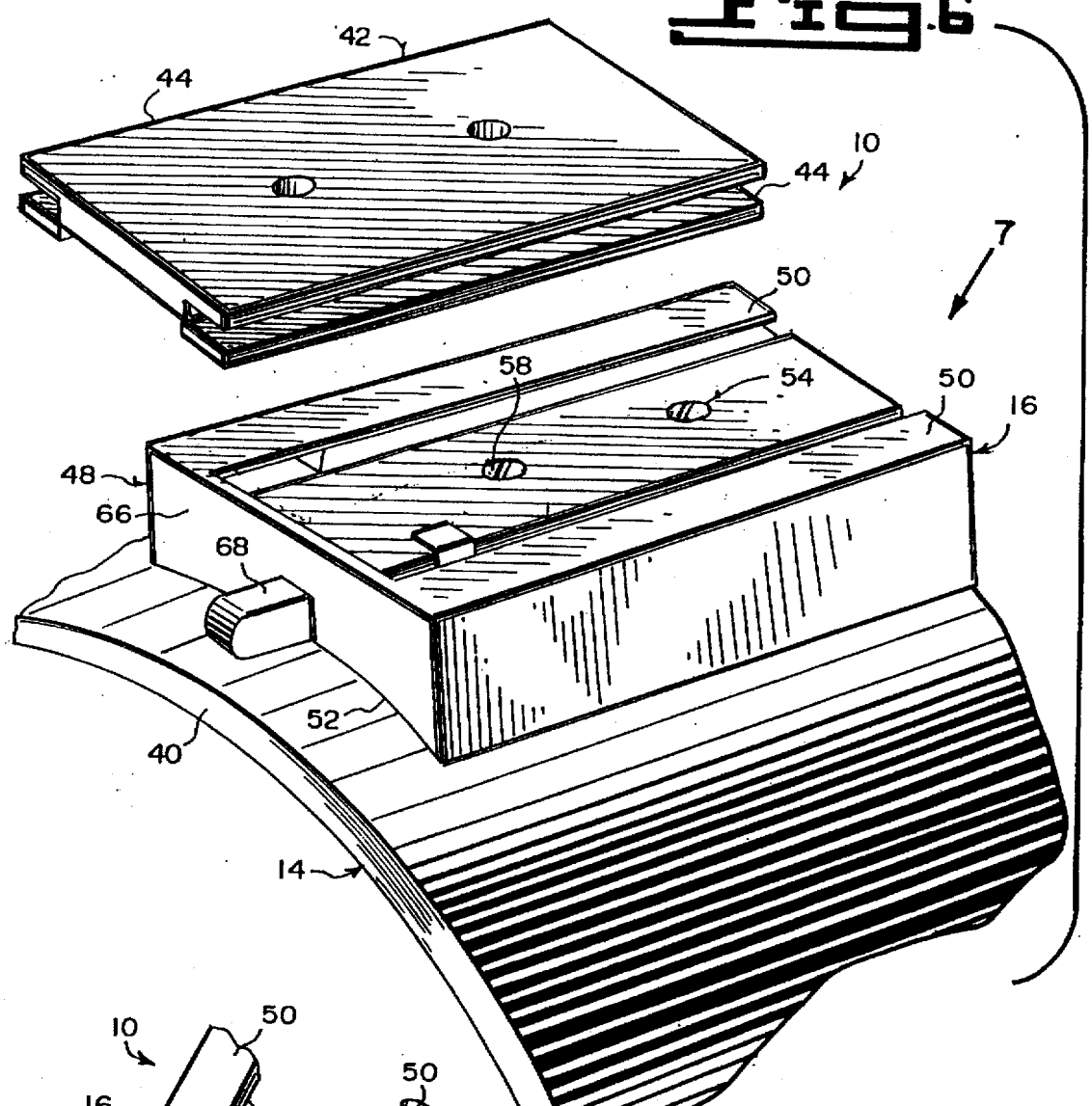
FIG. 6 is an enlarged perspective view taken in the direction of arrow 6 in FIG. 2 rotated ninety degrees, showing the annular bag holder broken away and the handle lock separated from the handle exploded therefrom.
Figure 7:
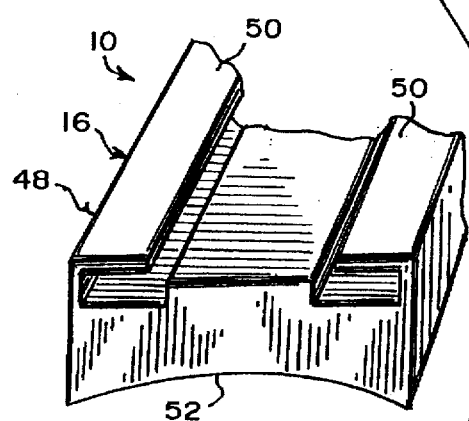
FIG. 7 is a rear perspective view of a portion of the spring release member taken in the direction of arrow 7 in FIG. 6.

Turning now descriptively to the drawings, in which similar reference characters denote similar elements throughout the several views, FIGS. 1 through 9 illustrate a pooch potty 10 comprising an elongated handle 12 with a bag holder 14. A structure 16 is for attaching the bag holder 14 to a lower end of the elongated handle 12. A bag 18 is carried on the bag holder 14. A person 20 can grip an upper end of the elongated handle 12 and position the bag holder 14 with the bag 18 under a squatting dog 22, to allow fecal matter to drop into the bag 18 instead of falling onto the ground 24. The bag 18 can be removed from the bag holder 14 and be disposed of.

The elongated handle 12 is length adjustable and includes three segments 26, 28 and 30 that are telescopic within each other, with the lower segment 26 having a bent angle end 32. Components 34 are for retaining the segments 26, 28 and 30 in their extended positions.

The retaining components 34 consist of the middle segment 28 and the lower segment 26 of the elongated handle 12 each having a pair of aligned transverse holes 36 through a top end thereof. The upper segment 30 and the middle segment 28 of the elongated handle 12 each have a dual spring loaded lock pin assembly 38, carried in a bottom end thereof. When the middle segment 28 and the upper segment 30 of the elongated handle 12 are extended, the dual spring loaded lock pin assemblies 38 will engage with the aligned transverse holes 36. The bag holder 14 is a flat annular continuous band 40, to receive the bag 18.

The attaching structure 16 comprises a handle lock plate 42, having a longitudinal groove 44 along each long side thereof. Fasteners 46 are for securing the handle lock plate 42 to the bent angle end 32 of the lower segment 26 of the elongated handle 12. A spring release member 48 has an inner longitudinal tongue 50 within each long side thereof and a curved back surface 52. The longitudinal grooves 44 of the handle lock plate 42 can slide into the inner longitudinal tongues 50. Fasteners 54 are for securing the curved back surface 52 of the spring release member 48 to the flat annular continuous band 40.

The first securing fasteners 46 are two screws 56 that extend through the handle lock plate 42 and the bent angle end 32 of the lower segment 26 of the elongated handle 12

(see FIG. 3). The second securing fasteners 54 are two screws 58, that extend through the spring release member 48 and the flat annular continuous band 40 (see FIG. 6).

The bag 18 is disposable and is made out of a thin plastic material 60. A clip 62 is mounted to the lower segment 26 of the elongated handle 12 adjacent the bent angle end 32. The clip 62 can be attached to a belt 64 worn on the person 20, when not in use.

The spring release member 48 includes each inner longitudinal tongue 50 being closed at a top end 66 and open at a bottom end, so that the spring release member 48 can slip onto the handle lock plate 42. A finger grip release lever 68 extends through the top end 66 of the spring release member 48, to allow the person 20 to disengage and then pull the spring release member 48 off of the handle lock plate 42.

OPERATION OF THE INVENTION

To use the pooch potty 10, the following steps should be taken:

1. Remove the clip 62 from the belt 64.
2. Place the bag 18 on the bag holder 14.
3. Connect the spring release member 48 onto the handle lock plate 42, which is on the bent angle end 32 of the lower segment 26 of the elongated handle 12.
4. Extend the middle segment 28 and the upper segment 30 until the dual spring loaded lock pin assemblies engage with the aligned transverse holes 36.
5. Take the dog 22 for a walk.
6. Place the bag 18 under the rear end of the dog 22 when the dog squats.
7. Remove the bag 18 after the dog 22 defecates into it and then toss the bag 18 into the trash.

LIST OF REFERENCE NUMBERS 10 pooch potty
12 elongated handle of 10
14 bag holder of 10
16 attaching structure of 10
18 bag of 10
20 person
22 squatting dog
24 ground
26 lower segment of 12
28 middle segment of 12
30 upper segment of 12
32 bent angle end of 26
34 retaining component in 12
36 pair of aligned transverse holes in 26 and 28
38 dual spring loaded lock pin assembly in 28 and 30
40 flat annular continuous band for 14
42 handle lock plate of 16
44 longitudinal groove in 42
46 first securing fastener of 16
48 spring release member of 16
50 inner longitudinal tongue of 48
52 curved back surface of 48
54 second fastener
56 screw of 46
58 screw of 54
60 thin plastic material for 18
62 clip on 26
64 belt on 20
66 top end of 48
68 finger grip release lever in 48

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A pooch potty comprising:
    a) an adjustable length elongated handle including:
        i) lower, middle and upper segments that are telescopic within each other, with said lower segment having a bent angle end; and
        ii) means for retaining said segments in an extended position;
    b) a bag holder comprising a flat annular continuous band to receive said bag;
    c) means for attaching said bag holder to a lower end of said elongated handle, said attaching means including:
        i) a rectangular handle lock plate having long and short sides and a longitudinal groove along each long side thereof;
        ii) first securing means for securing said handle lock plate to said bent angle end of said lower segment of said elongated handle;
        iii) a spring release member having an inner longitudinal tongue within each long side thereof and a curved back surface, whereby said longitudinal gooves of said handle lock plate can slide into said inner longitudinal tongues; and
        iv) second securing means for securing said curved back surface of said spring release member to said flat annular continuous band; and
    d) a bag carried on said bag holder, so that a person can grip an upper end of said elongated handle and position said bag holder with said bag under a squatting dog, to allow fecal matter to drop into said bag instead of falling onto the ground, whereby said bag can be removed from said bag holder and be disposed of.

2. A pooch potty as recited in claim 1, wherein said retaining means includes:
    a) said middle segment and said lower segment of said elongated handle each having a pair of aligned transverse holes through a top end thereof; and
    b) said upper segment and said middle segment of said elongated handle each having a dual spring loaded lock pin assembly carried in a bottom end thereof, so that when said middle segment and said upper segment of said elongated handle are extended, said dual spring loaded lock pin assemblies will engage with said aligned transverse holes.

3. A pooch potty as recited in claim 2, wherein said first securing means includes two screws that extend through said handle lock plate and said bent angle end of said lower segment of said elongated handle.

4. A pooch potty as recited in claim 3, wherein said second securing means includes two screws that extend through said spring release member and said flat annular continuous band.

5. A pooch potty as recited in claim 4, wherein said bag is disposable and is made out of a thin plastic material.

6. A pooch potty as recited in claim 5, further including a clip mounted to said lower segment of said elongated handle adjacent said bent angle end, so that said clip can be attached to a belt worn on the person when not in use.

7. A pooch potty as recited in claim 6, wherein said spring release member includes:

a) each said inner longitudinal tongue being closed at a top end and open at a bottom end, so that said spring release member can slip onto said handle lock plate; and b) a finger grip release lever extending through said top end of said spring release member to allow the person to disengage and then pull said spring release member off of said handle lock plate.

8. A pooch potty as recited in claim 1, wherein said first securing means includes two screws that extend through said handle lock plate and said bent angle end of said lower segment of said elongated handle.

9. A pooch potty as recited in claim 1, wherein said second securing means includes two screws that extend through said spring release member and said flat annular continuous band.

10. A pooch potty as recited in claim 1, wherein said bag is disposable and is made out of a thin plastic material.

11. A pooch potty as recited in claim 1, further including a clip mounted to said lower segment of said elongated handle adjacent said bent angle end, so that said clip can be attached to a belt worn on the person when not in use.

12. A pooch potty as recited in claim 1, wherein said spring release member includes:

a) each said inner longitudinal tongue being closed at a top end and open at a bottom end, so that said spring release member can slip onto said handle lock plate; and b) a finger grip release lever extending through said top end of said spring release member to allow the person to disengage and then pull said spring release member off of said handle lock plate.

* * * * *